United States Patent [19]  [11] 4,329,688
Goldie  [45] May 11, 1982

[54] SIGNAL INJECTION CIRCUIT FOR RADAR GAIN AND NOISE TESTS

[75] Inventor: Harry Goldie, Randallstown, Md.

[73] Assignee: The United States of America as represented by the Secretary of the Air Force, Washington, D.C.

[21] Appl. No.: 119,345

[22] Filed: Feb. 7, 1980

[51] Int. Cl.³ .......................... G01S 7/40; G01S 13/00
[52] U.S. Cl. ......................................... 343/17.7; 434/2
[58] Field of Search ............................ 434/2; 343/17.7

[56] References Cited
U.S. PATENT DOCUMENTS
4,053,890 10/1977 Woodson et al. .................. 343/17.7

Primary Examiner—S. C. Buczinski
Attorney, Agent, or Firm—Donald J. Singer; Willard Matthews, Jr.

[57] ABSTRACT

A circuit injects the signal from a stable localized oscillator past a pin diode switch through a first circulator to a waveguide, a second circuit injects a noise signal from a generating diode through a second circulator to the first circulator to the waveguide, a switching system causes the diodes to function in a coordinated manner.

6 Claims, 2 Drawing Figures

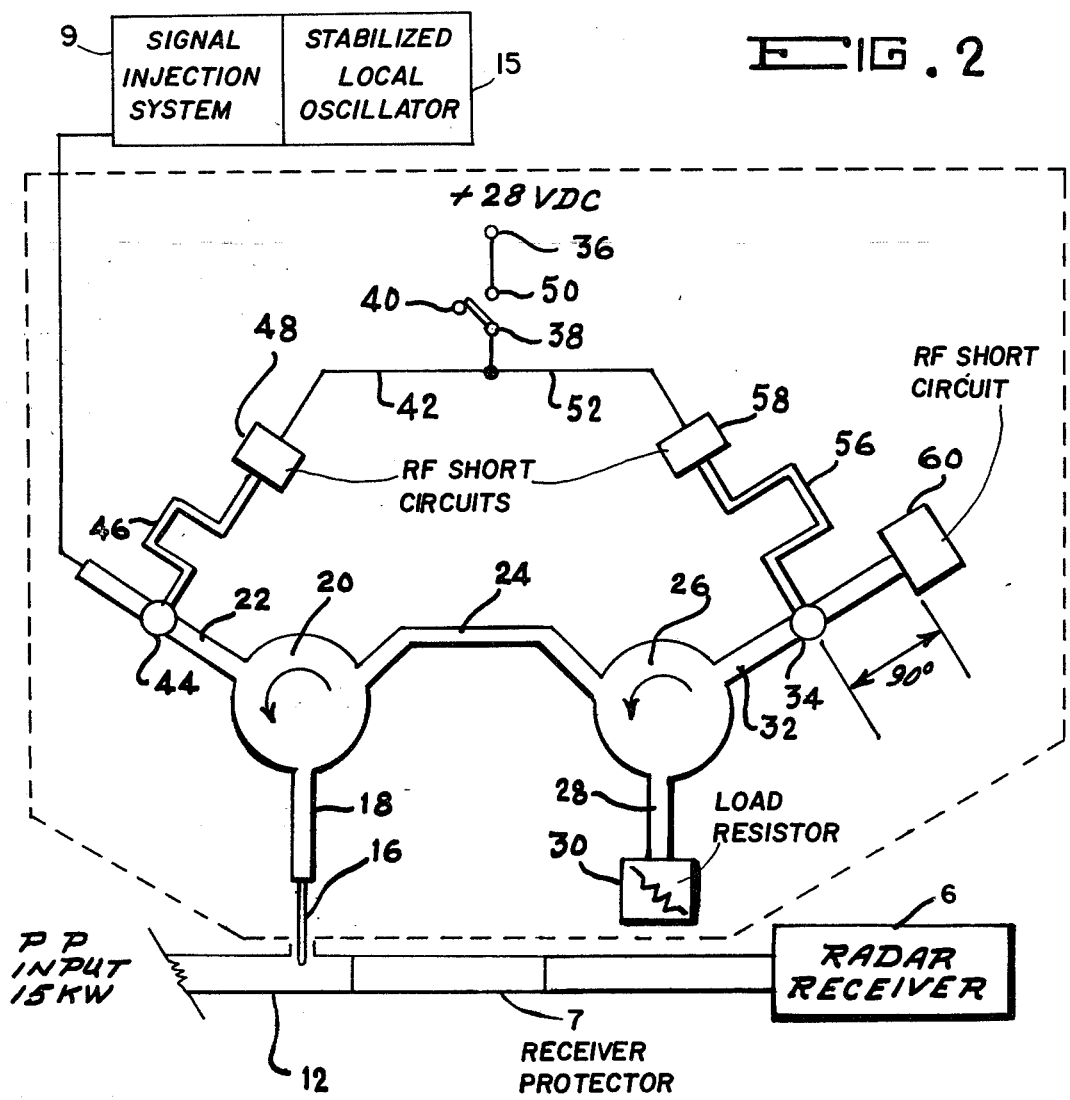

SIGNAL INJECTION CIRCUIT FOR RADAR GAIN AND NOISE TESTS

STATEMENT OF GOVERNMENT INTEREST

The invention described herein may be manufactured and used by or for the Government for governmental purposes without the payment of any royalty thereon.

BACKGROUND OF THE INVENTION

The invention relates generally to microwave circuits and more particularly to circuits that provide coordinated injection of test signals into a waveguide.

Modern radar systems include sub-systems built in for the automatic testing of various components to insure that maximum performance is achieved at all times.

As part of these testing systems it has been found useful to add appendage ports to various microwave devices whereby known signals may be injected and processed by the device. The output of the device is then analyzed and compared with the input signal and its operational effectiveness determined.

Typically, in modern radar systems there are two RF coupled ports for built-in testing. The first occurs at the receiver protector input port and is utilized for the injection of a coherent signal from a local stabilized oscillator. This signal is used to measure receiver gain and characteristics of the sensitivity time control.

The second port is coupled to the input port of a low noise field effect transistor amplifier. This injects a noise signal from which receiver noise is measured.

The disadvantage to this system is found in that the noise test is made at a point where a significant portion of the noise factor is omitted, thereby degrading the results of any measurements.

The receiver protector is typically a dynamic non linear device. Being a very lossy component, the receiver protector degrades the noise figure and changes receiver sensitivity as it changes its characteristics.

Properly, to obtain total noise the test signal should be injected into the input to the receiver, which is effectively the receiver protector. The difficulty with this approach in the past has been the injection of a coherent signal from the stabilized local oscillator at the same point. Until now, no way had been found which would allow both signals to be injected in a coordinated, effective manner. With the circuit to be described, it is now possible to obtain measurements of noise variations through the highly lossy, dynamic receiver protector as well as the remainder of the system.

SUMMARY OF THE INVENTION

The invention relates to a circuit which permits the injection of both noise and stable coherent signals into a radar receiver.

The circuit, utilizing serially connected circulators and a pin diode switch, is able to insert a stable coherent signal or alternatively a noise signal into a waveguide. The waveguide would be connected to a radar receiver with the ability to test the inserted signals.

A coherent stabilized signal is controlled by a pin diode switch in a waveguide connected to one port of a circulator. A noise diode is located in another waveguide connected to a circulator which is in turn connected to the first circulator. A switch controls the diodes in a manner that when the pin diode is back biased, passing the stabilized signal the noise diode is quiescent. Alternatively, when the noise diode is energized the diode switch is short circuited, thereby reflecting the noise signal back into the circulator and hence out to the waveguide.

It is therefore an object of the invention to provide a new and improved circuit for injecting signals into waveguides.

It is another object of the invention to provide a new and improved microwave circuit for injecting non homogenous signals into a waveguide on a time sharing basis.

It is a further object of the invention to provide a new and improved microwave circuit that is economical to produce and utilizes conventional, currently available components.

It is still another object of the invention to provide a new and improved microwave circuit for injecting signals into the same coupled port that is simple and easily fabricated.

It is still a further object of the invention to provide a new and improved microwave circuit that improves the testing practices and performance of modern radar.

It is still another object of the invention to provide a new and improved microwave switching circuit that functions in the presence of strong RF levels.

These and other advantages, features and objects of the invention will become more apparent from the following description taken in connection with the illustrative embodiments in the accompanying drawings.

DESCRIPTION OF THE DRAWINGS

FIG. 1 is a block diagram of a radar system;
FIG. 2 is a schematic representation of the invention.

DESCRIPTION OF THE PREFERRED EMBODIMENT

Referring now to FIG. 1, radar system is shown having an antenna 4 and transmitter 5. Also connected to the antenna is a receiver 6 with receiver protector 7. The system utilizes conventional microwave guides for interconnection. The radar receiving system includes a build-in test system 8 which tests signals injected by the signal injection circuit 9 and compares them to the original signal. Built-in test system system 8 comprises the integrated microwave signal injection circuit of the invention.

Concerning FIG. 2, a radar receiver is shown at 6 and connected thereto is a waveguide 12. Shown within the waveguide is a receiver protector 7. An RF matching network 16 connects waveguide 18 from circulator 20 into waveguide 12. RF matching network 16 is a conventional microwave 27 db bidirectional probe. Circulator 20 has three connecting waveguides including 18 and 22 which is connected to a stabilized local oscillator 15, and through which a coherent signal enters the circuit. Stabilized local oscillator 15 is located in signal injection circuit 9. Waveguide 24 interconnects circulators 20 and 26. Circulator 26 has two remaining waveguides including 28 which is connected to a one watt load resistor 30 to dissipate RF energy in the circuit. Waveguide 32 contains noise generating diode 34 and associated circuitry.

In operation, high power RF energy from waveguide 12 is coupled by means of r.f. re-entrant choke 16 11 and R.F. matching network down to 27 dB and dissipated in resistor 30 connected to circulator 26. RF power is not allowed to be incident on the noise diode 34 where it could actuate it or degrade it.

A 28 VDC power supply (36) is connected to switch 38. When the switch is set on contact 40 during the interpulse (receive) period, noise diode source 34 which is mounted across the MIC stripline is not energized. No voltage is fed through line 42 and pin diode switch 44 which is a simple shunt mounted diode switch is open allowing the coherent signal from stabilized local oscillator 15 to pass, enter circulator 20 and exit via guide 18 and enter waveguide 12. Stabilized local oscillator 15 provides the coherent signal for signal injection circuit 9 and is an integral element thereof. The coherent signal is utilized to test the gain of the radar receiver.

Inductance 46 is included in line 42 to prevent RF from the coherent signal from being lost. An RF short circuit 48 passes any RF leaking by the inductance directly to ground, eliminating any possibility of RF energy entering the power supply.

Moving switch 38 to contact 50 actuates noise diode 34 and biases pin diode switch 44 by causing currents from the 28 volt DC source to flow through the MIC stripline to ground through the the diodes. Energy from the noise diode passes through circulator 26 to circulator 20 via guide 24. The noise signal follows guide 22 to short circuited pin diode 44 which reflects over 98 percent of the noise energy back into circulator 20 where it exits via guide 18 to waveguide 12.

This configuration allows noise energy 9 dB above the absolute minimum to enter waveguide 12 and the receiver protector 7. Additional diodes may be added if more isolation is required.

Connected to line 52 are an inductance 56 and RF short circuit 58 which serve the same purpose as identical devices on line 42. Guide 32 extends beyond noise generating diode 34 and terminates in an RF short circuit 60 which is located 90° (a quarter wavelength) away from the diode. Since 90° is the center of frequency of operation at approximately the center of the bandwidth all power is forced to enter circulator 26.

It can be seen then that by moving switch 38 between ports 40 and 50 coherent and noise signals are selectively and alternately injected into the waveguide to be further tested by the built-in test systems of the radar receiver.

Although the invention has been described with reference to a particular embodiment, it will be understood to those skilled in the art that the invention is capable of a variety of alternative embodiments within the spirit and scope of the appended claims.

I claim:

1. An integrated microwave signal injection circuit for use with a radar system having an antenna, a transmitter connected to the antenna, a receiver and receiver protector connected to the antenna, where the receiver includes a built-in signal test system and wherein said microwave signal injection circuit is electrically connected between the antenna and receiver protector, comprising; first and second interconnected microwave circulators; a waveguide connecting the first circulator to the receiver protector input waveguide; a source of coherent microwave energy; waveguide means connecting said source to the first circulator means; a first switch means in the connecting waveguide for controlling the passage of RF energy; means connected to the second circulator for dissipating RF energy; a waveguide connected to the second circulator; diode means in the said waveguide for generating a noise signal, a second switch means; a source of voltage connected to the second switch means; circuit means connecting the first switch means, diode means and second switch means whereby closing the second switch will prevent the passage of coherent RF energy past the first switch and cause a noise signal to be generated in the noise generating diode and transmitted to the receiver protector, and opening said second switch allows passage of coherent RF energy to the receiver protector and causes the noise generating diode to become quiescent.

2. An integrated microwave circuit according to claim 1 including an RF matching network connecting the first circulator waveguide to the receiver protector input waveguide.

3. An integrated microwave circuit according to claim 2 wherein the first switch means is a pin diode switch.

4. An integrated microwave circuit according to claim 3 wherein the means for dissipating RF energy is a load resistor.

5. An integrated microwave circuit according to claim 4 wherein the circuit means connecting the second switch means and the first switch means, and the second switch means and the diode means each include an RF inductance in series with an RF short circuit.

6. An integrated microwave circuit according to claim 5 wherein the waveguide connecting the noise generating diode to the second circulator means include an RF short circuit $\lambda/4$ from said diode, $\lambda$ being the circuit operating frequency wavelength at center of bandwidth.

* * * * *